Feb. 17, 1959    W. F. PETERSON ET AL    2,874,011
TRUNK PISTON
Filed March 18, 1957
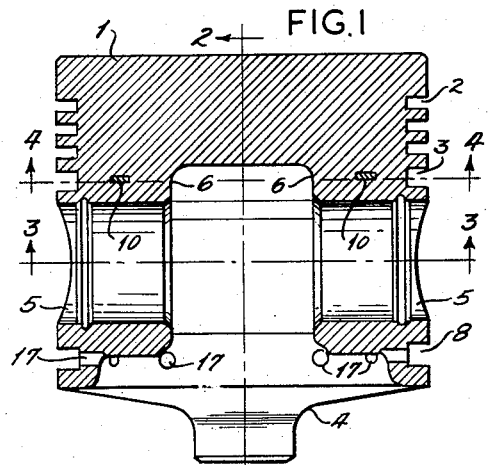
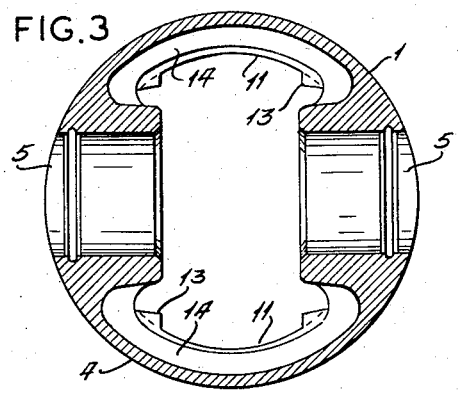
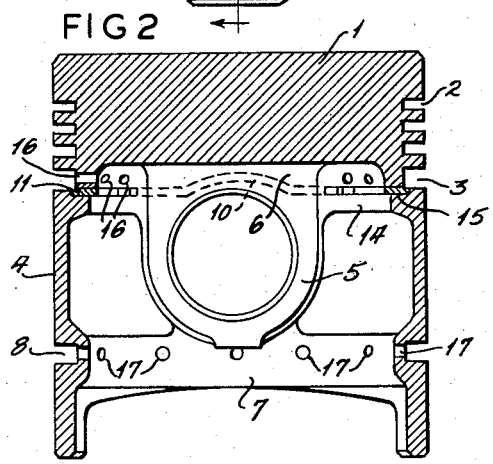
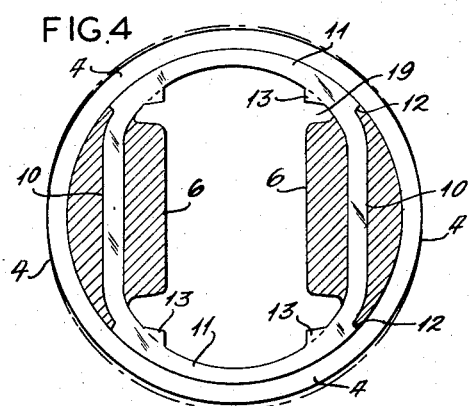
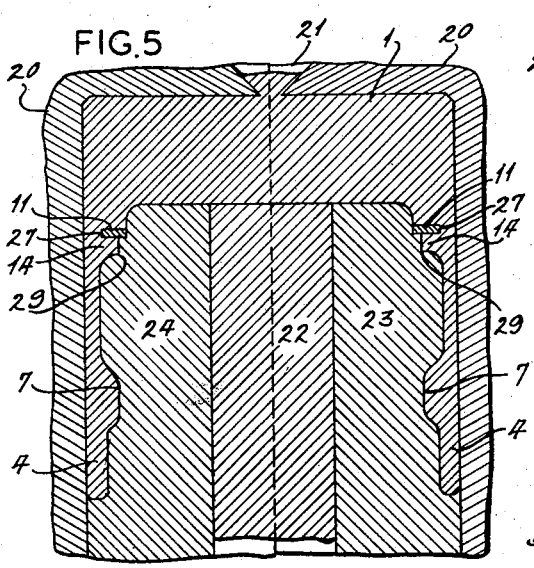
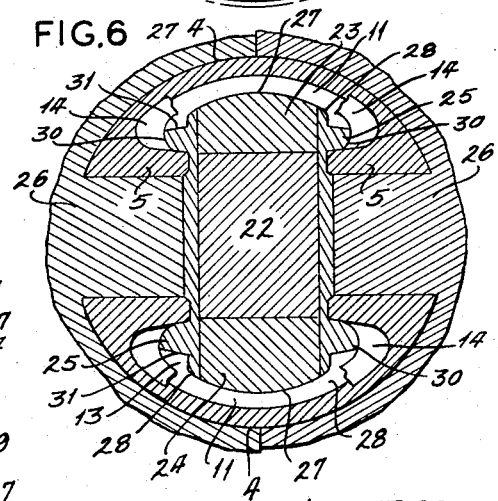
INVENTORS.
WILLIAM F. PETERSON
WILLIAM M. YENNER
By Brumiga & Sutherland
ATTORNEYS.

United States Patent Office 2,874,011
Patented Feb. 17, 1959

2,874,011

TRUNK PISTON

William F. Peterson, Creve Coeur, and William M. Venner, Brentwood, Mo., assignors to Sterling Aluminum Products, Inc., St. Charles, Mo., a corporation of Missouri Application March 18, 1957, Serial No. 646,875

10 Claims. (Cl. 309—13)

This invention relates to trunk pistons, particularly of a type designed for use in internal combustion engines for automobiles. Such pistons are usually constructed of a metal of relatively high thermal expansion, such as aluminum and magnesium alloys containing various alloying elements, such as copper, silicon, nickel, manganese, etc. Where silicon is employed on the order of 12%, the thermal expansion is materially reduced. Copper, nickel and manganese impart hardness and strength to the alloy. The temperatures encountered in internal combustion engines are, however, high, so that there is liability of seizure when hot and a looseness when cold.

A trunk piston of the type described comprises generally a head, a skirt and wrist pin bosses on the inside of the skirt. The head is grooved to receive the piston rings and is of smaller diameter than the skirt, which provides the guiding cross-head for the piston. The skirt is separated from the head in one or both regions of the thrust faces by circumferential slots. The skirt may be of circular contour, but is usually made oval, with the major diameter in the regions of the thrust faces and with the minor diameter in the regions of the bosses. Some pistons have vertical slots. Furthermore, the piston is also relieved in the regions of the bosses. The skirt is usually given a standard taper, with a smaller diameter at the top.

The separation of the skirt from the head as heretofore constructed has usually been by circumferential slots; however, that restricts the heat flow from the head to the skirt and to the cylinder walls and also permits passage of oil and gas through the slots. Sometimes the circumferential slot is in the lowest packing ring groove.

In Patent No. 2,737,426, issued to applicants' assignee, a control element is provided which is anchored in the regions of the bosses and has a connecting part extending along but unanchored in one of the thrust faces. In Patent No. 2,737,427 the control element is in the form of a ring which extends completely around the piston, is anchored in the boss regions, but is unanchored in the thrust faces. In both patents, the skirt is separated from the head in the regions of one or both thrust faces. In Patent No. 2,737,427 the separation of the head from the skirt in one or both thrust faces is axially at the bottom of the lowest packing ring groove, so that upon cutting of the lowest packing ring groove the separation of the head from the skirt is concurrently accomplished. In that Patent No. 2,737,427 such operation is enabled by providing the inside core with an overhang or overhangs extending circumferentially along a to-be-formed thrust face or faces, and axially and radially to the bottom of the packing ring groove, so that upon cutting of that packing ring groove the cut will extend into a recess left by the overhang or overhangs so as to simultaneously separate the skirt from the head. In that patent the control element is positioned below the circumferential slot or slots.

One of the objects of this invention is to improve the construction and operation of the pistons described in said patents.

Further objects will appear from the detailed description, in which will be set out an illustrative embodiment of this invention; it is to be understood, however, that this invention is susceptible of various embodiments within the scope of the appended claims.

Referring to the accompanying drawing:

Fig. 1 is a vertical section along the wrist pin bosses of a piston embodying this invention;

Fig. 2 is a section on the line 2—2, Fig. 1;

Fig. 3 is a section on the line 3—3, Fig. 1;

Fig. 4 is a section on the line 4—4, Fig. 1;

Fig. 5 is a view similar to Fig. 2, but showing the piston as cast in the mold and around the core; and Fig. 6 is a section similar to Fig. 3, but showing the piston as cast in the mold and around the core.

Generally stated, and in accordance with an illustrative embodiment of this invention, a piston comprises a head having a packing ring groove, a skirt having wrist pin bosses and thrust faces, and a control element extending around the boss regions, extending along one or both thrust faces and extending axially to the packing ring groove along the thrust face or faces. The piston is of a metal of relatively high thermal expansion, while the control element is of a metal of relatively low thermal expansion. The control element is anchored in the boss regions, but unanchored in one or both thrust faces. In the method of making the piston, the piston metal is cast over the element positioned as previously described, causing the piston metal to envelope and cast anchor the control element along the boss regions, but to leave the element unanchored along the thrust face or faces. The piston metal is then permitted to solidify on the control element and this is followed by cutting of the packing ring groove so as to expose the element thereat along one or both thrust faces.

Referring to Figs. 1–4, 1 designates a piston head provided with packing ring grooves 2, the lowest groove being shown at 3. Connected with the head is a skirt provided with thrust faces 4 and wrist pin bosses 5. The wrist pin bosses are connected to the head as shown at 6. The skirt may also be provided with an annular part 7 in order to permit the cutting of a bottom groove 8.

Referring again to Figs. 1–4, cast into the piston is an element in the form of a ring having parts 10 in the regions of the bosses and parts 11 in the regions of the thrust faces. This element may be constructed in any suitable manner and as shown, there are shoulders 12 and inward projections 13. The element is positioned to extend axially to the packing ring groove and, in Fig. 2, it is shown as extending slightly axially beyond (upwardly above, Fig. 2) the groove 3 and circumferentially slightly beyond (left and right, Fig. 2) the bottom of the groove. Below the element the piston metal extends inwardly as shown at 14 to form shoulders 15 for the element. As shown in Fig. 2, the middle parts of the element 10 may curve upwardly. The bottom of the packing ring groove 3 may be perforated as shown at 16 and the annular part 7 may likewise be perforated as shown at 17.

The control element may be of any suitable metal, viz., of a metal of relatively low coefficient of thermal expansion and contraction, such as steel, either cold rolled steel, or one of the steels which has a very low coefficient of thermal expansion and which has been employed in pistons generally. The control element may however be of a copper alloy or of a bronze alloy, having a melting point materially higher than the melting point of aluminum or magnesium. It is not necessary, but preferred, that the control element be of a metal of relatively low thermal expansion, depending upon whether the function is to simply separate the skirt from the head in the region or regions of a thrust face or faces, or whether it also be employed to control the expansion and contraction of the piston.

Figs. 5 and 6 show a method of making the piston in a permanent mold provided with a permanent multi-piece core. The mold and core may be constructed as in Patent No. 1,952,199, but the core may also be constructed as shown in Patent No. 2,676,372, both assigned to applicants' assignee. The mold is as usual formed of two parts 20 sliding on a base and provided with a gate 21. The multi-piece core comprises a center core composed of sections 22, 23 and 24, together with sections 25 for forming the wrist pin bosses, the mold being provided with cores 26 extending into the to-be-formed bosses. In practice and with the parts as shown in Figs. 5 and 6, and after solidification of the piston casting, the center core sections 22, 23 and 24 are withdrawn downwardly by collapsing the core sections as in Patent No. 2,676,372, and thereafter the side sections 25 are moved into the space vacated by the center core so as to clear the bosses; after outward movement of the mold sections 20, the piston can be picked off.

The outer sections 23 and 24 of the center core are provided with recesses 27 and the side cores 25 are provided with continuations 28 of the recesses 27 to form the inwardly projecting parts of the elements 13 at the thrust faces. The sections 23 and 24 of the center core are also provided with recesses 29 and the side cores are provided with continuations 30 of the recesses 29 to form the inwardly extending parts 14. The inward projections 13 on the element serve to engage recesses 31 in the side cores 25 to position the element on the core and in the mold.

The center core (shown only generally) can be readily withdrawn, because when constructed as in Patent No. 2,676,372, downward withdrawal of the center section 22 will collapse the side sections 23 and 24 to withdraw them radially from the inside of the casting.

It will be seen by reference to Fig. 2 in connection with Fig. 5, that the formation of the core will be simple in its construction in that no overhang or overhangs are necessary in the regions of a thrust face or faces. That is brought about by positioning the control element 11 to extend axially and radially to the bottom of a to-be-formed packing ring groove along a thrust face or faces. During the casting operation the piston metal is caused to flow, envelope and cast anchor the element along the boss regions, but to leave the element unanchored along a thrust face or faces.

Upon solidification of the casting and after its removal from the mold, the lowest packing ring groove 3 is cut. This will expose the element along one or both thrust faces. While upon solidification and cooling the element is clamped axially (vertically, Figs. 1 and 2), the clamping action is not so as to prevent the skirt from moving with respect to the head. However, there is actually no actual spacing of the head from the skirt because the element parts 11 contact both the head and the skirt so that flow of heat from the head to the skirt and to the cylinder will not be impeded, while flow of oil and gas past the piston is prevented. The perforations 16 simply act as reliefs underneath the piston ring when installed in the lowest packing ring groove.

The action of the piston is similar to that shown in Patent No. 2,737,427. Upon solidification and cooling of the piston casting and before the formation of the lowest packing ring groove 3, the control element and the piston metal thereover will be stressed so as to tend to move outwardly radially at the top of the to-be-formed thrust faces. Upon cutting of the packing ring groove 3 to the element, the stress is partially relieved, permitting the skirt to move outwardly at the thrust face or faces because here again the clamping of the element axially is not sufficient to prevent such action.

The above described action is apparent from Fig. 4. Upon separation of the skirt from the head, the skirt will move outwardly at the thrust face or faces as shown by the dotted lines. The piston can now be machined as usual with the head of smaller diameter than the skirt, and the skirt can be machined to fit the cylinder, either round or slightly oval, with the major axis along the thrust face axis. In service in the engine the piston will expand along the wrist pin axis and by doing so the stress will be progressively relieved along the thrust face axis as the piston heats up in the engine so as to maintain the skirt dimension diametrically.

An illustrative example is as follows: A piston of a diameter of 3.65 inches and of a length of 4.175 inches had an element of cold rolled steel 0.090 inch thick, with the horizontal dimension of the control element at 10, 0.19 inch, and at 11, 0.20 inch. The aluminum alloy was the usual one comprising 10% copper, 0.50% magnesium and the balance aluminum. The skirt had a taper of 0.001 inch and the skirt itself was oval, with a major axis on the wrist pin axis about 0.015 inch larger than on the boss axis. The head was about 0.10 inch smaller than the skirt. Such a piston remains conformed to the cylinder at a very low clearance, viz., a few thousandths of an inch.

It will therefore be seen that the invention accomplishes its objects. A piston is provided which can be closely fitted to the cylinder of an internal combustion engine and will substantially maintain its dimensions from hot to cold so that there will be no seizing when hot and no slapping when cold. The heat transmission from the head to the skirt and to the cylinder is left substantially unimpaired, while leakage of oil and gas past the piston is substantially prevented. The control element may be exposed at only one or both thrust faces.

Having thus described the invention, what is claimed and desired to be secured by Letters Patent is:

1. A trunk piston, comprising, a head having a packing ring groove, a skirt having wrist pin bosses and thrust faces, and an element extending around the boss regions, extending along a thrust face and extending axially to said packing ring groove along said thrust face.

2. A trunk piston, comprising, a head having a packing ring groove, a skirt having wrist pin bosses and thrust faces, and an element extending around the boss regions, extending along both thrust faces and extending axially to said packing ring groove along said thrust faces.

3. A trunk piston, comprising, a head having a packing ring groove, a skirt having wrist pin bosses and thrust faces, and an element extending around and anchored in the boss regions, extending along but unanchored in a thrust face and extending axially to said packing ring groove along said thrust face.

4. A trunk piston, comprising, a head having a packing ring groove, a skirt having wrist pin bosses and thrust faces, and an element extending around and anchored in the boss regions, extending along but unanchored in both thrust faces and extending axially to said packing ring groove along said thrust faces.

5. A trunk piston of a metal of relatively high thermal expansion, comprising, a head having a packing ring groove, a skirt having wrist pin bosses and thrust faces, and an element of a metal of relatively low thermal expansion extending around and anchored in the boss regions, extending along but unanchored in a thrust face and extending axially to said packing ring groove along said thrust face.

6. A trunk piston of a metal of relatively high thermal expansion, comprising, a head having a packing ring groove, a skirt having wrist pin bosses and thrust faces, and an element of a metal of relatively low thermal expansion and extending around and anchored in the boss regions, extending along but unanchored in both thrust faces and extending axially to said packing ring groove along said thrust faces.

7. A trunk piston of an aluminum or magnesium alloy, comprising, a head having a packing ring groove, a skirt having wrist pin bosses and thrust faces, and an element of a metal of relatively low thermal coefficient of expansion and contraction extending around and anchored in the boss regions by solidification of the alloy on said element, said element extending along but unanchored in a thrust face and extending axially and radially to said packing ring groove along said thrust face.

8. A trunk piston of an aluminum or magnesium alloy, comprising, a head having a packing ring groove, a skirt having wrist pin bosses and thrust faces, and an element of a metal of relatively low thermal coefficient of expansion and contraction extending around and anchored in the boss regions by solidification of the alloy on said element, said element extending along but unanchored in both thrust faces and extending axially and radially to said packing ring groove along said thrust faces.

9. A trunk piston of a metal of relatively high thermal expansion, comprising, a head having a packing ring groove, a skirt having wrist pin bosses and thrust faces, and an element of a metal of relatively low thermal expansion extending around and anchored in the boss regions by solidification of the alloy on said element, said element extending along but unanchored in a thrust face and extending axially and radially to said packing ring groove along said thrust face.

10. A trunk piston of a metal of relatively high thermal expansion, comprising, a head having a packing ring groove, a skirt having wrist pin bosses and thrust faces, and an element of a metal of relatively low thermal expansion and extending around and anchored in the boss regions by solidification of the alloy on said element, said element extending along but unanchored in both thrust faces and extending axially and radially to said packing ring groove along said thrust faces.

References Cited in the file of this patent

UNITED STATES PATENTS

| | | |
|---|---|---|
| 2,125,938 | Long | Aug. 9, 1938 |
| 2,128,663 | Nelson | Aug. 30, 1938 |
| 2,149,862 | Nelson | Mar. 7, 1939 |
| 2,174,644 | Weatherhead et al. | Oct. 3, 1939 |
| 2,244,954 | Lenz et al. | June 10, 1941 |